United States Patent
Fabre

(10) Patent No.: US 6,993,605 B2
(45) Date of Patent: Jan. 31, 2006

(54) ADAPTIVE RUN-TIME DATA TRANSFER OPTIMIZATION

(75) Inventor: B. Scott Fabre, Aloha, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 239 days.

(21) Appl. No.: 09/796,770

(22) Filed: Feb. 28, 2001

(65) Prior Publication Data

US 2002/0120797 A1 Aug. 29, 2002

(51) Int. Cl.
*G06F 3/00* (2006.01)

(52) U.S. Cl. .............................. 710/60; 710/8; 710/10; 710/29; 710/33; 710/53; 710/58; 710/60

(58) Field of Classification Search ................. 710/8, 710/10, 29, 33, 53, 58, 60
See application file for complete search history.

(56) References Cited

U.S. PATENT DOCUMENTS

| | | | |
|---|---|---|---|
| 3,648,247 A | | 3/1972 | Guzak, Jr. |
| 4,258,418 A | | 3/1981 | Heath |
| 4,644,463 A | * | 2/1987 | Hotchkin et al. ............. 710/57 |
| 4,860,244 A | | 8/1989 | Bruckert et al. |
| 5,117,486 A | | 5/1992 | Clark et al. |
| 5,539,915 A | * | 7/1996 | Burton et al. ................. 710/21 |
| 5,842,042 A | | 11/1998 | Kodama et al. |
| 5,890,014 A | * | 3/1999 | Long ............................. 710/8 |
| 5,991,835 A | | 11/1999 | Mashimo et al. |
| 6,012,136 A | | 1/2000 | Brown |
| 6,029,239 A | | 2/2000 | Brown |
| 6,061,305 A | * | 5/2000 | Williams ..................... 368/113 |
| 6,144,814 A | * | 11/2000 | Newell et al. ................. 399/16 |
| 6,280,105 B1 | * | 8/2001 | Iida ............................. 400/74 |

FOREIGN PATENT DOCUMENTS

| | | | |
|---|---|---|---|
| EP | 1003327 A2 | * | 5/2000 |
| JP | 06348647 A | * | 12/1994 |
| JP | 09153000 A | | 6/1997 |
| JP | 2000231457 A | | 8/2000 |

* cited by examiner

*Primary Examiner*—Kim Huynh
*Assistant Examiner*—Angel L Casiano
(74) *Attorney, Agent, or Firm*—Law Office of Karen Dana Oster, LLC

(57) ABSTRACT

A method and apparatus optimizes the speed and efficiency of data transfer between two devices having different data input/output rates. In one embodiment, the present invention is directed to a computer software driver or hardware apparatus that may work with any port and/or network. The driver has a calibrator portion for optimizing data transfer between a CPU and a peripheral. The calibrator portion includes a data input/output rate profiler. The profiler preferably sends run-time data samples to the peripheral, builds a table that relates each data sample to an aggregate data transfer rate, and selects the optimum result as a model for further data transfer. A preferred method for performing the present invention is also included.

23 Claims, 5 Drawing Sheets

ADAPTIVE RUN-TIME DATA TRANSFER OPTIMIZATION

BACKGROUND OF THE INVENTION

The present invention is directed to data transfer systems and more specifically to a method and apparatus for optimizing the speed and efficiency of data transfer between two computer hardware devices having different input and output rates.

Optimizing an input flow to match an output flow is a common theme in all arts. A properly calculated input flow often yields higher efficiency of output flow than an improperly calculated input flow, even though the improperly calculated input flow may contain more material or data. In other words, a faster input rate does not always yield the optimum output rate.

Flow systems often include one or more storage areas, working areas, or "tanks" with a dynamic equilibrium afforded by balancing input and output so that the amount of material in the tank, or the amount of data in a storage area, remains at an efficient level and does not overrun the capacity of the tank or storage area.

An example of this principle is a freeway during rush hour. If the number of cars being allowed onto the freeway at the entrance ramps can be restrained to equal the number of cars exiting or passing through the freeway, then a maximum freeway efficiency can be achieved and a traffic jam avoided.

Data transfer rates are the rates at which data is transferred from one device or place to another device or place. Data transfer rates are often a measure of the performance of microprocessors, memory chips, ports, and peripherals such as disk drives, modems, printers, and other hardware devices ("peripherals"). If the sending device has a data transfer rate that is too fast, the receiving device may be overrun with data. This is a common problem when a central processing unit ("CPU") sends data to a peripheral such as a printer. The opposite problem may occur when a peripheral sends data to a CPU. The data transfer rate of a CD-ROM drive, for instance, must be accurate for the video, music, or animation data to keep pace with the CPU and yet be played back without introducing pauses.

CPUs typically transfer data to and from a disk drive or memory chip for data storage or buffering. These data storage devices have input mechanisms for receiving data and output mechanisms for transmitting data. It is well known that as a disk drive or memory chip approaches its limit capacity for holding data, it becomes greatly inefficient. This is because all data transactions must be swapped with preexisting stored data using the limited free space available. Near the limit capacity, the amount of data being internally swapped becomes greater than the amount of data that can be transmitted out of the device, resulting in an extremely slow disk drive or a frozen memory chip. In the case of a full disk drive, the problem is caused by an accumulation of data that the disk drive is not necessarily trying to transmit out in order to make room for more incoming data. But in the case of a memory chip acting as a dynamic buffer for a peripheral, the problem is caused by an accumulation of data waiting to be transmitted out to make room for new incoming data. The output is relatively slow because a peripheral often converts data into a physical manifestation using relatively slow electromechanical steps. This causes an output bottleneck for a memory chip acting as a dynamic buffer.

As a dynamic buffer stores data waiting to be transmitted out to a peripheral, there is wasted data overhead in the temporary storage and manipulation of the data. Instead of immediately transmitting out newly received data, a dynamic buffer must keep track of the data by batching, storing, mapping, and swapping stored data. Tracking more data than can be transmitted out when a storage device is near its capacity requires a great deal of overhead that makes a slow throughput problem even worse.

Data storage buffers with expandable capacity are one way to solve the problem of an output bottleneck. But these are of little use when the input rate is always faster than the output rate. The capacity to expand the buffer has a limit that is soon reached and the buffer is overrun with data.

Another way to solve the problem of an output bottleneck is to modify the rate at which a transmitting device transmits data to efficiently match the rate at which a receiving device can receive data. For instance, a CPU may adjust the speed at which it transmits data to a peripheral device. The peripheral device may receive data only at a limited speed, usually related to its ability to pass the data out of the system to make room in the buffer to receive more data.

From a mathematical standpoint, the optimum speed of data input for a receiving device relative to optimized data output of a transmitting device is a problem of "related rates" solvable by differential equations. But mathematical solutions are often oversimplified and may have other disadvantages. It is noteworthy that the optimum data input speed is not always obvious for theoretical treatment. A very slow data input rate may yield the best results depending on the characteristics of the data, the data handling scheme (e.g., 32-bit versus 64-bit bus speed), and unforeseen factors inherent in the specific hardware that are difficult to capture in a mathematical model.

The disadvantages inherent in a mathematical model for optimizing data transfer may be circumvented by other methods of determining the optimum rate of data transfer between a transmitting device and a peripheral. For example, experimental trial and error is one possible method. The transmitting device performs a plurality of data transmitting trials and selects the trial with the best results as a model for future input/ouput ("I/O") configuration. The trial and error method is often superior to theoretical and mathematical methods for determining an optimum data transfer rate since it is based on actual trials carried out on a specific system having a specific CPU and a specific peripheral.

An example of a run-time trial and error method for optimizing data transfer for specific hardware is included in a SPINRITE® software program for optimizing the number of sectors per track on a hard disk. The SPINRITE® software builds a table of data transfer rates achieved by writing and reading data to a hard disk using a different number of sectors per track for each trial. Since sectors are the smallest units of data that the computer can read into memory in a single step, the optimum data transfer rate should theoretically be calculable using a mathematical model. But the theoretical calculation can be faulty because so many parameters, such as the rotational speed of the disk and percentage of data errors, can vary from the mathematical model. The SPINTRTE® trial and error method circumvents the shortcomings of a theoretical calculation by running trials in real time on the physical hardware at hand and simply selecting an optimized number of sectors per track from the trial yielding the highest throughput.

Known methods also adopt various schemes for adjusting the data transfer rates between various parts of a computer by attempting to match I/O rates by changing the speed of the data. U.S. Pat. No. 3,648,247 to Guzak, entitled "Data Handling System," for example, discloses the use of a buffer between a record reader and a data processor. A circuit varies the speed of the record reader to maintain the system in continuous operation without emptying or filling the buffer. U.S. Pat. No. 5,991,835 to Mashimo et al., entitled "Peripheral Data Storage Device in Which Time Interval Used for Data Transfer From Relatively Fast Buffer Memory to Relatively Slower Main Memory Is Selected in View of Average of Time Intervals During Which Data Blocks Were Recently Received From Host" (the "Mashimo reference"), seeks an efficient data transfer rate from buffer to disk by averaging the time intervals of delivery of the most recent 3–8 data blocks from the host. The Mashimo reference is directed to optimizing a hard disk cache using a set scheme. These references do not solve problems of unmatched data transfer rates that may exist between a CPU and its peripherals. They rely on a set scheme such as a static circuit or algorithm that is derived from a theoretical expectation of how the hardware should act.

Other methods match I/O rates by adding data handling capacity. For example, U.S. Pat. No. 4,860,244 to Bruckert et al. is directed to a buffer system for the I/O hardware of a digital processing system. The Bruckert system includes additional buffer paths so that a controller or bus adapter for I/O hardware may operate at speeds closer to processor and memory speeds, or at least not slow down transfers between other faster parts of the system. U.S. Pat. No. 5,842,042 to Clark et al. is directed to a buffer between two processors for packetizing blocks of data having different sizes and rates. The Clark buffer includes a bus-to-bus adapter for coupling two processors. The adapter allows multiple independent data transfer operations to occur simultaneously. The adapter also includes a mechanism for prioritizing and allotting service time to data transfer operations with higher priority. The Bruckert and Clark methods add data processing capacity to improve unmatched I/O rates. It may be possible to solve the problem of unmatched I/O rates by redesigning hardware to have greater data handling capacity, or by adding more memory. But this is expensive, and it does not solve the problem of how to match a CPU having a fast data transfer rate to a slow peripheral, such as a printer, without adding or redesigning hardware. The Bruckert and Clark methods also do not address the need to develop inexpensive peripherals having data transfer rates that are slower than a CPU.

Some methods use a limit switch scheme to keep a data buffer at an optimum level. U.S. Pat. No. 4,258,418 to Heath is entitled, "Variable Capacity Data Buffer System." The Heath system includes a data storage device disposed between a processor and an I/O device. A circuit establishes a threshold storage capacity for the data storage device and maintains temporary data storage in the device at this desirable threshold level. U.S. Pat. No. 5,117,486 to Kodama et al. is directed to a data transfer method for a buffer that prevents the buffer from emptying or overflowing by using a temporary holding circuit. The Heath and Kodama methods are directed to keeping a buffer from overflowing, not to maximizing data throughput. Keeping a data buffer at a predetermined level may be completely independent of optimizing a data transfer rate between a CPU and a peripheral. The optimum data transfer rate may occur without any buffer.

A combination of dividing and scheduling tasks has also been used to manage different I/O rates. U.S. Pat. Nos. 6,012,136 and 6,029,239 to Brown are directed to communications systems with a configurable data transfer architecture. The Brown system architecture includes an operating system and data protocol that allow tasks to be efficiently partitioned and scheduled. This prevents a memory access bottleneck in devices with embedded digital signal processors. The Brown systems rely on a theoretical model for configuring the architecture. This may not give an optimum data transfer rate for specific hardware.

BRIEF SUMMARY OF THE INVENTION

The present invention is a method and apparatus for optimizing the speed and efficiency of data transfer between two devices having different data I/O transfer rates.

In one embodiment, the present invention is directed to a computer software driver. The driver preferably has a calibrator and a calibrated data transferor. The calibrator is for optimizing data transfer between a CPU or other host and at least one peripheral. The calibrator portion preferably has an I/O rate profiler for the peripheral. The I/O rate profiler transfers data samples to the peripheral, receives performance feedback from the peripheral, and selects the optimum result as a model for further data transfer. The present invention may work with any data connection, port, and/or network. A preferred method for performing the present invention is also included.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
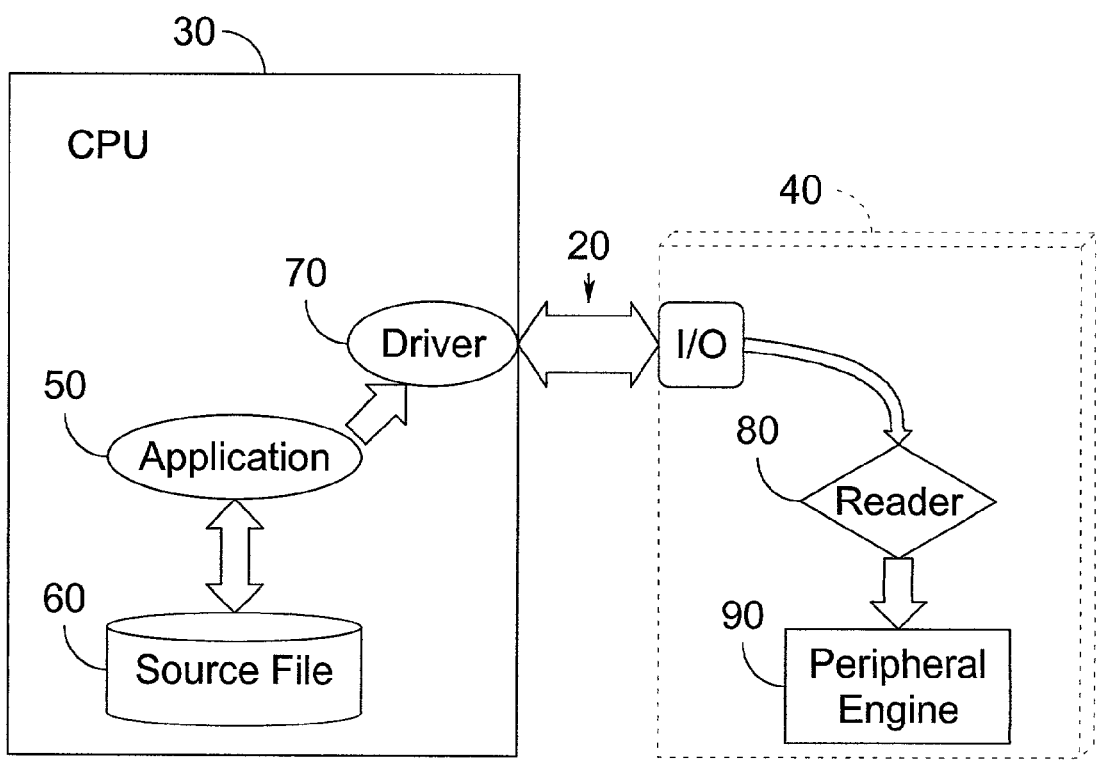
FIG. 1 is a block diagram of prior art I/O flow between a CPU and a peripheral using a software driver.

The present invention is method and apparatus for adaptive run-time calibration and optimization of the data transfer rate between a specific CPU or other host and a specific peripheral. The present invention profiles the I/O rate of data transfer between a CPU and a given peripheral and optimizes it.

Various hardware devices in a computer system process data at different rates. Peripherals usually have to convert data into a physical manifestation of the data. The physical conversion of data often includes relatively slow electromechanical steps. Many peripherals, therefore, have onboard memory buffers for receiving data and storing it until the data can be used. Peripherals also commonly have many I/O configurations for efficiently receiving input from a variety of sources. Peripheral I/O configurations are usually determined at least in part by hardware. Serial ports, parallel ports, USB ports, and network interfaces require a peripheral to have specific I/O configurations. Peripherals may also use virtual software ports that modify data or transfer rate. Printers, for instance, may use a page description language for receiving data in several optional forms. Printer emulations are common. The same printer may mimic several unrelated printer models. And within a given emulation, the printer may have several page modes.

Computers also have many I/O configurations. The I/O configuration may be determined by the I/O hardware. A USB port can transfer data faster than a parallel port. An optical port may have its own data transfer rate limitations. There are many data configurations that software applications may transmit to a peripheral. For instance, a new software version of an operating system may transfer data faster than an older software version using the same hardware because of improved methods of configuring the data.

Typically the microprocessor in a CPU is the fastest data processing device in a computer system. Accordingly, a CPU that includes a microprocessor, bus, and I/O hardware is usually capable of transmitting data much faster than peripherals can receive the data. Therefore, data transfer times between a given host CPU and a peripheral are not always optimum. This problem is solved in known methods by simply making the data input speed as fast as possible. Attempts to optimize data transfer between a hypothetical generic CPU and a peripheral are usually done only at the time of peripheral product development. The developer approximates likely data input from a hypothetical CPU and develops a peripheral product that receives data according to the approximation. Since the speed of data transmission to peripherals may vary widely among CPUs, the input schemes adopted for peripherals often include averaging a variety of theoretical data transfer rates, or offering a limited number of configuration combinations and protocols to receive different rates of data input. The compromised efficiency caused by using approximation and averaging schemes for receiving data input may be eased by onboard memory buffers and caches, but these need their own optimization and seldom achieve optimum data transfer rates when left to themselves.

Data transfer rate problems may also arise after peripheral product development. New hardware may not fit the profile chosen by the developer. An old printer may need to receive data from a CPU that was not yet invented when the printer was manufactured. The data transfer rate of the CPU was unforeseen at the time of the printer's development. Likewise, a specific printer may not perform as expected of other printers of the same model. Worn mechanical parts or variances in tolerance may make a specific printer function at a unique speed.

The present invention solves these problems by executing a run-time calibration between a CPU and a given peripheral. The calibration may be done using trial and error experimental results to achieve the optimum data transfer rate. Alternately, other feedback mechanisms may be used. The peripheral 40 is preferably a printer, such as a page-description-language-based device having many configuration combinations. The present invention, however, will work with any peripheral device that receives data from a CPU. Exemplary peripherals include but are not limited to printers and plotters of all types, fax machines, disk and tape storage devices, memory storage devices, monitors, servos, optical devices, multimedia devices, modems, controllers, interfaces, cards, ports, and other CPUs.

FIG. 1 shows a prior art I/O flow 20 between a CPU 30 and a peripheral 40. A software application 50 exchanges data with an application source file 60 and may transmit data to the peripheral 40 using a prior art software driver 70 that has been loaded into memory. The driver 70 is typically customized to operate specific hardware elements in a specific type or model of peripheral 40. Prior art drivers are not able to adaptively optimize data I/O flow using run-time calibration for specific peripherals, such as printers. Even for highly customized drivers, the speed and other characteristics of I/O flow 20 between the CPU 30 and peripheral 40 are often preset (and not optimized) for the sake of simplicity and a small memory requirement for loading the driver. A noncustomized generic driver that can operate different models of peripherals may be even less optimized than a customized driver to the specific data I/O parameters of any given individual peripheral.

The prior art driver 70 shown in FIG. 1 transfers data to a reader 80 in the peripheral 40. Prior art data readers 80 do little more than translate the data received from a CPU into machine instructions for the peripheral engine. The reader 80 transmits the received data to the engine 90 of the peripheral 40 as fast as the engine 90 will allow. If the data being received by the peripheral 40 outpaces the ability of the peripheral engine 90 to process the data, the reader 80 becomes overrun with data. A memory buffer may temporarily forestall the peripheral 40 from being overrun with data, but the buffer itself may become overrun. Using a buffer that does not become overrun, however, is different from calibrating the rate of data transmitted to a peripheral 40 in order to optimize peripheral efficiency. A successful buffer may forestall a peripheral from becoming overrun with data, but may not necessarily optimize the aggregate data transfer rate of the peripheral 40. Further, a buffer may reduce rather than enhance a peripheral's data transfer rate efficiency.

Figure 2:
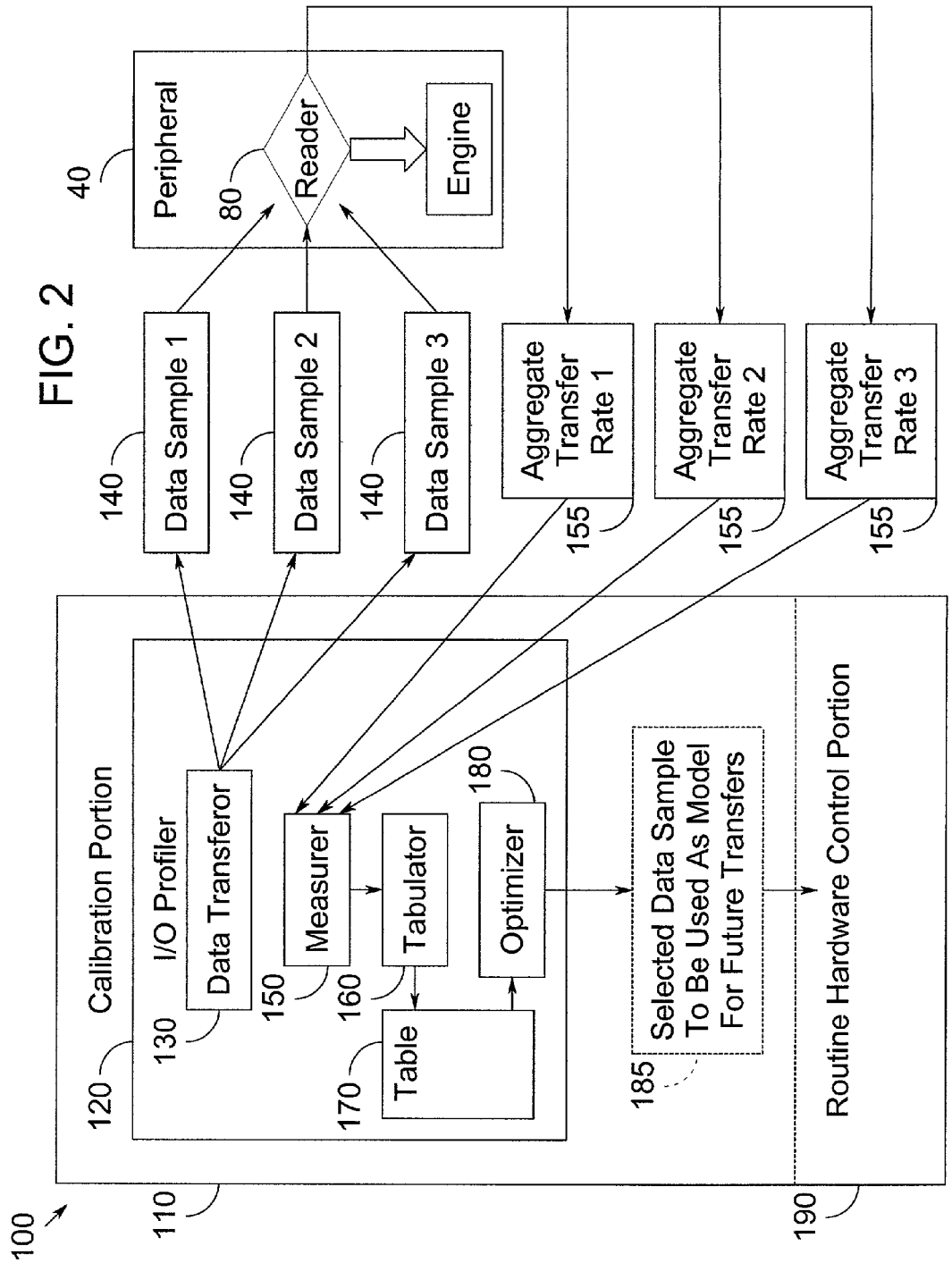
FIG. 2 is a block diagram of a first preferred software driver embodiment of the present invention.

FIG. 2 illustrates a first preferred embodiment of the present invention in which a software driver 100 loaded into the memory of a host CPU controls a specific peripheral 40. Although the first preferred embodiment is shown using a software driver 100, the present invention could also be implemented using a hardware device.

A calibrator 110 included in the software driver 100 may be integral to the driver 100 when loaded into memory, or the calibrator 110 may be a separate part of the driver 100 that is only temporarily loaded into memory. Alternately, the calibrator portion 110 may also be a "terminate and stay resident" program called by the software driver 100 or called independently by a human operator.

The calibrator 110 included in the driver 100 performs adaptive run-time data transfer optimization between the host CPU in which the driver 100 resides and a specific peripheral 40. The calibrator 110 may include an I/O rate profiler 120 for optimizing a data transfer rate with a specific peripheral 40. The I/O rate profiler 120 may include a data transferor 130 that preferably sends data samples 140 to the specific peripheral 40.

One preferred purpose of the data samples 140 is to establish run-time information about the specific peripheral 40. The data samples may differ in at least one characteristic that may affect the overall speed at which the specific peripheral 40 completes a given task ("aggregate data transfer rate" 155). Typical data characteristics affecting the aggregate data transfer rate 155 include but are not limited to: the speed at which data samples 140 are transferred between the CPU and the specific peripheral 40; the size of the data transfer window allotted to a data sample; the time delay between frames of data within a data sample; the complexity of the data within a data sample; and the form of data within a data sample. By sending data samples 140 that vary in a characteristic relevant to peripheral 40 data transfer rate efficiency, it is preferably possible to select a data sample that yields the best peripheral 40 data transfer rate efficiency and use the selected data sample as a model for future I/O data flow between a CPU and a specific peripheral 40.

The present invention may include in the peripheral 40 a reader 80 that is able to sense aggregate transfer rate 155 information and other information related to peripheral efficiency, such as peripheral engine performance. Some peripherals may already have an intrinsic means for sending feedback information to a driver 100 embodiment of the present invention, but other peripherals may need to have a reader 80 component of the present invention added to send feedback information to the driver 100. The present invention may be able to determine aggregate transfer rate information from still other peripherals without the use of any reader 80.

A measurer 150 included in the driver 100 may record or calculate an aggregate data transfer rate 155 corresponding to a particular data sample 140. If the data transferor 130 exchanges an exemplary twenty data samples 140 with a specific peripheral 40, then there will preferably be twenty aggregate data transfer rates 155, one for each data sample 140 exchanged.

A tabulator 160 included in the driver 100 places a plurality of aggregate data transfer rates 155 (from the measurer 150) and corresponding data samples 140 into an array or table 170. An optimizer 180 portion of the driver 100 may contain a comparator, sort routine, and/or other conditional logic routine to select a best and/or preferred aggregate data transfer rate 155 from the values in the table 170.

The data sample 140 that corresponds to the selected optimum aggregate data transfer rate 155 is sent as a selected data sample 185 to a calibrated data transferor 190 included in the driver 100. The calibrated data transferor 190 may customize routine (i.e., noncalibration) data output using the selected data sample 185 as a model for formatting future data and for configuring the CPU and peripheral 40 for an optimum data transfer rate. Whatever characteristics of the selected data sample 185 caused a resulting optimum aggregate data transfer rate 155 can be imparted to all future data transfers between a specific CPU and a specific peripheral 40.

The final result is run-time optimized I/O between a specific CPU and at least one specific peripheral 40 that allows the specific peripheral 40 to function at peak speed and efficiency. For example, the peripheral may be a printer that includes a reader 80 portion of the present invention added during manufacture. When the printer is used with CPUs having different data transmission rates, the present invention will be able to calibrate the printer to achieve an optimum aggregate data transfer rate 155 with each CPU. Even if the printer becomes faulty or slow due to mechanical wear or partial malfunction, the present invention will be able to calibrate data transmission to the printer to achieve an optimum aggregate data transfer rate 155.

In one variation the calibrator 110 portion of the driver 100 functions automatically during first-time data I/O flow with a new peripheral. In another variation, the driver has a normal mode and a calibration mode. The calibration mode may be manually activated by a human operator; automatically activated by other software, hardware, and/or events (such as a new type of data); or both. In a third variation, the driver 100 calibrates a specific peripheral 40 at set time intervals for periodic maintenance and/or optimization.

The drivers, devices, routines, and operations described above for the preferred embodiment shown in FIG. 2 are meant only to aid in conceptualizing the present invention. Some or all of the drivers, devices, routines, and operations described above could be combined into fewer driver portions, devices, routines, and/or operations. For instance, the entire present invention might be performed by only a few lines of software code with no discernible subroutines.

Figure 3:
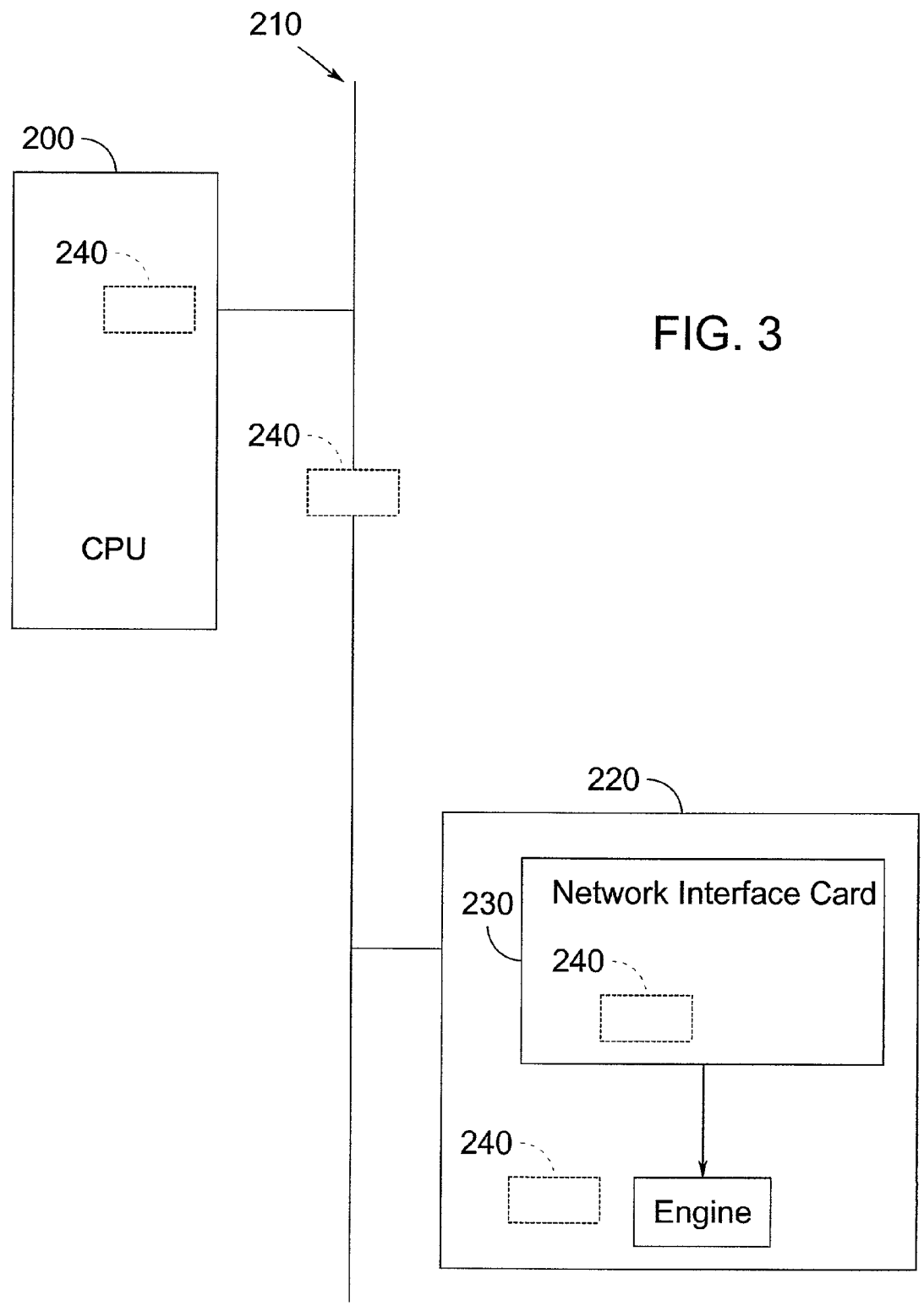
FIG. 3 is a block diagram of a second preferred embodiment of the present invention as used in a network.

FIG. 3 shows a second preferred embodiment of the present invention. In the second preferred embodiment a CPU 200 and a specific peripheral 220 are attached to a local area network, Internet, ethernet, and/or generic network 210 operating a network software protocol, for example Novell Netware or the OSI transmission control protocol/Internet protocol ("TCP/IP"). In the physical and data-link layers of TCP/IP, data is logically grouped into data frames, but at the higher TCP/IP layers data may be referred to as packets, datagrams, segments, or messages. For simplicity, "frames" will be adopted to refer to data transferred using a network protocol. In the TCP/IP protocol, peripherals may receive frames by advertising a data window size on the network.

Optimum throughput into a specific peripheral 220 is not always achieved by sending frames to the specific peripheral 220 using the largest possible window size. If too much data is sent too fast, the network interface card 230 of the specific peripheral 220 will be overrun. This results in downward adjustment of the window size. The advertised window size from the specific peripheral 220 may be reduced to zero until the receiving network interface card 230 can accept more data. It requires time to adjust the window size, so the adjustment results in a slower aggregate data transfer rate. By slowing down the frames sent from the host CPU 200, the receive rate of the peripheral's network interface card 230 is not exceeded and the shortest possible aggregate data transfer rate is achieved.

One or more hardware or software embodiments 240 (or portions thereof) of the present invention may be included in the host CPU 200, the network 210, the network interface card 230, and/or the specific peripheral 220 to optimize the data transfer rate between the host CPU 200, network 210, and specific peripheral 220 as discussed in detail in relation to FIG. 2. The hardware or software embodiment of the present invention 240 measures the number of bytes transferred using TCP/IP through various advertised data window sizes, and/or over a specific period of time using various time delay intervals between frames transferred. For various trials, the hardware or software embodiment 240 builds an efficiency table relating throughput (measured in bytes transferred) to advertised data window size and time delay interval between frames. The most effective aggregate rate of data transfer as a function of window size and time delay between each frame is then selected for future data transfers to the specific peripheral 220.

Figure 4:
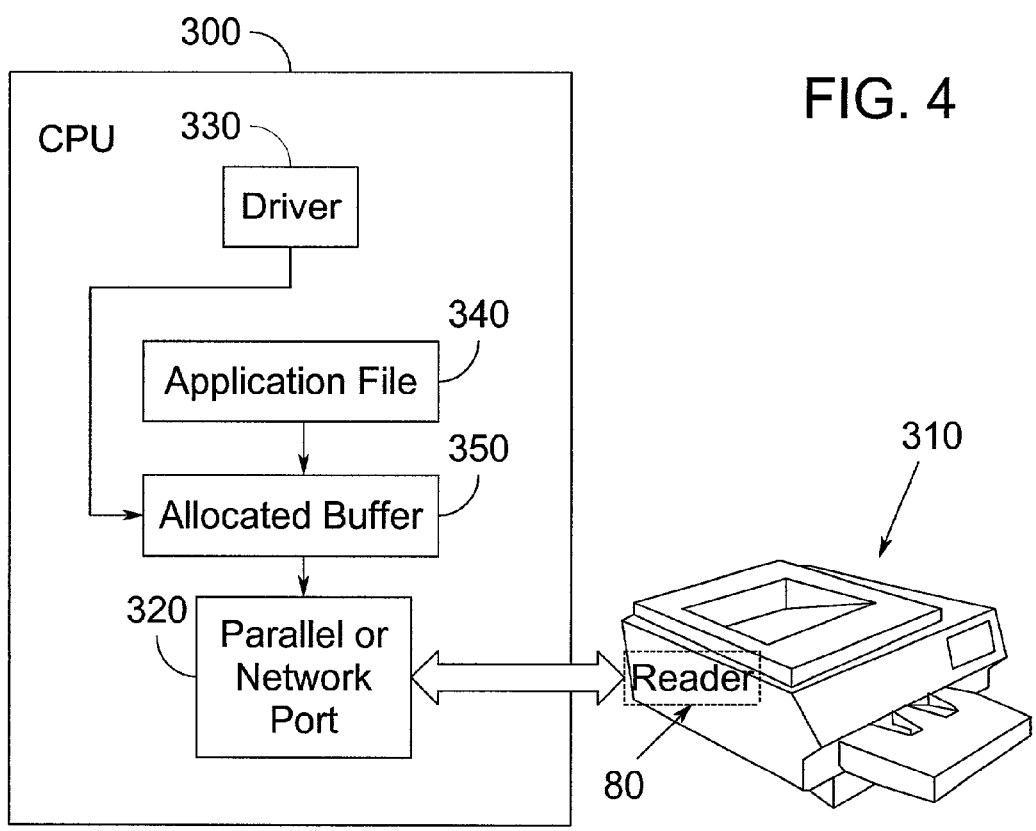
FIG. 4 is a block diagram of a third preferred embodiment of the present invention as used with a parallel port.

FIG. 4 shows a third preferred embodiment of the present invention in which a host CPU 300 is connected to a specific peripheral 310 shown as a printer through a parallel port 320 having an allocated buffer 350. Since overrunning the peripheral's ability to receive data results in lost time due to handshaking, knowing the optimum buffer size and optimum data transfer rate to the parallel port results in fewer data hold-offs and a faster aggregate data transfer rate.

The third preferred embodiment is preferably a software driver 330, but may also be a software plug-in or a hardware device such as a chip and/or card. The driver 330 sends an arbitrarily long data file 340, such as a print job, to the specific peripheral 310 multiple times. Each time the data file 340 is sent, the driver 330 varies the size of the allocated buffer 350 on the host CPU 300 and/or varies the rate of data transmission to the parallel port 320. A reader 80 portion of the present invention in the specific peripheral 310 may send feedback information through the parallel port 320 to the driver 330. The driver 330 builds a table relating an aggregate data transfer rate for each trial (measured in time required for the peripheral 310 to complete its job of processing the data) to size of the allocated buffer 350 and the rate of data transfer to the parallel port 320. The buffer size and rate of data transfer to the parallel port 320 corresponding to the fastest aggregate data transfer rate is then selected for future data transfers to the peripheral 310.

Figure 5:
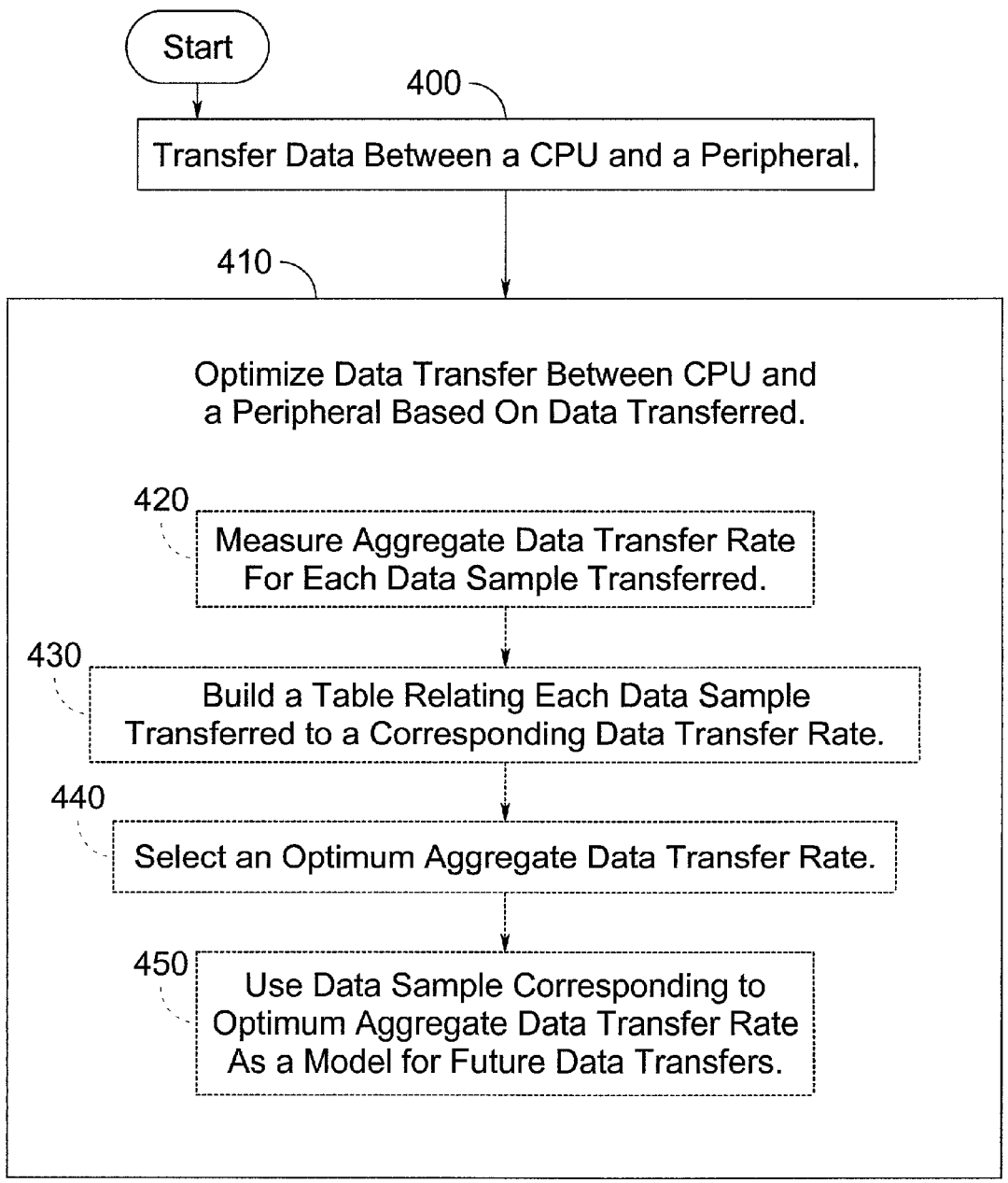
FIG. 5 is a flowchart of a preferred method of the present invention.

FIG. 5 shows a preferred method for adaptive run-time data transfer optimization between a CPU or other host and at least one peripheral. The method includes the run-time step of transferring data between a CPU and at least one peripheral 400. The step of optimizing data transfer between the CPU and at least one peripheral based on the run-time data 410 is also included in the method.

In one variation of the method, the step of optimizing data transfer based on run-time results may also include further steps. Optionally, a corresponding aggregate data transfer rate or other feedback resulting from each data sample transferred may be measured 420. An optional table relating each data sample to a measured corresponding aggregate data transfer rate may be built 430. Preferably, the optimum aggregate data transfer rate is selected 440, and the corresponding data sample may be used as a model for future data transfers 450.

The use of data samples to prompt feedback from a peripheral is optional. Some peripherals may inherently send run-time data or feedback to a CPU that could be used by the present invention to optimally calibrate data transfer without the need for the CPU to send data samples.

The trial and error aspect of the present invention is also optional. For example, certain peripherals may inherently send run-time data or feedback to a CPU that could be used by the present invention to optimally calibrate data transfer without the need for trials. Other peripherals may require only one data exchange with the present invention for optimum calibration, thereby eliminating the need for repetitive trials.

The terms have been employed in the foregoing specification are used as terms of description and not of limitation, and are not intended to exclude equivalents of the features shown and described or portions of them. The scope of the invention is defined and limited only by the claims that follow.

What is claimed is:

1. A run-time optimizer for data transfers between a transmitting device and a peripheral, comprising:
    (a) a calibrator;
    (b) a run-time data transfer rate profiler associated with said calibrator, said run-time data transfer rate profiler further comprising:
        (i) a run-time data sample transferor for sending run-time data samples;
        (ii) a tabulator for relating run-time data samples transferred to said peripheral by said run-time data sample transferor to corresponding aggregate data transfer rates; and
        (iii) an efficiency optimizer for selecting an optimum aggregate data transfer rate wherein a run-time data sample corresponding to said optimum aggregate data transfer rate is used to create said optimum data transfer rate profile;
    (c) said profiler for generating an optimum data transfer rate profile for said peripheral; and
    (d) a calibrated data transferor for transmitting data according to said optimum data transfer rate profile.

2. The run-time optimizer of claim 1 further comprising a reader for sensing said aggregate data transfer rates.

3. The run-time optimizer of claim 1 further comprising a measurer for determining said aggregate data transfer rates.

4. The run-time optimizer of claim 1, wherein said peripheral is a printer.

5. The run-time optimizer of claim 1, wherein said run-time data samples differ in one or more characteristics selected from the group consisting of:
    (a) speed at which said run-time data samples are transferred between said transmitting device and said at least one peripheral;
    (b) size of at least one data transfer window allotted to said run-time data samples;
    (c) time delay between frames of data within said run-time data samples transferred to said peripheral;
    (d) complexity of data within said run-time data samples transferred to said peripheral; and
    (e) form of data within said run-time data samples transferred to said peripheral.

6. A run-time optimizer for data transfers between a transmitting device and a peripheral, comprising:
    (a) a calibrator;
    (b) a run-time data transfer rate profiler associated with said calibrator, wherein said run-time data transfer rate profiler is a software driver comprising:
        (i) a data transferor for transferring run-time data samples between said transmitting device and said peripheral;
        (ii) a reader for sensing aggregate data transfer rates;
        (iii) a measurer for recording aggregate data transfer rates resulting from each run-time data sample transferred;
        (iv) a tabulator for building a table of said aggregate data transfer rates corresponding to said run-time data samples transferred; and
        (v) an efficiency optimizer for selecting an optimum run-time data sample from said table based on an optimum aggregate data transfer rates;
    (c) said profiler for generating an optimum data transfer rate profile for said peripheral; and
    (d) a calibrated data transferor for transmitting data according to said optimum data transfer rate profile.

7. The computer software driver of claim 6 wherein said calibrated data transferor is used for routine data transfer between said transmitting device and said peripheral, wherein said routine data transfer is performed using said optimum run-time data sample as a model for formatting routine data and configuring hardware of said transmitting device and said peripheral.

8. A method for adaptive run-time data transfer optimization between a transmitting device and at least one peripheral, said method comprising the steps of:
    (a) transferring run-time data samples between said transmitting device and said at least one peripheral;
    (b) sensing an aggregate data transfer rate for each run-time data sample transferred;
    (c) selecting an optimum aggregate data transfer rate; and
    (d) optimizing data transfer between said transmitting device and said at least one peripheral based on a run-time data sample corresponding to said optimum aggregate data transfer rate, said step of optimizing data transfer further comprising the steps of:

(i) a measuring a corresponding aggregate data transfer rate resulting from each run-time data sample transferred;
(ii) building a table relating each run-time data sample to said corresponding aggregate data transfer rate;
(iii) selecting an optimum run-time data sample from said table based on an optimum aggregate data transfer rate; and
(iv) transferring data to said at least one peripheral using said optimum run-time data sample as a model.

9. The method of claim 8 further comprising the step of performing said adaptive run-time data transfer optimization between a page-language-description-printer and a CPU.

10. The method of claim 8 further comprising the step of optimizing at least one data window size advertised by said at least one peripheral over a network.

11. A method for adaptive run-time data transfer optimization between a transmitting device and at least one peripheral, said method comprising the steps of:
(a) transferring run-time data samples between said transmitting device and said at least one peripheral, wherein said step of transferring run-time data samples further comprises one or more steps selected from the group of steps consisting of:
(i) varying transfer speeds of said run-time data samples;
(ii) varying at least one data transfer window size allotted for said run-time data samples;
(iii) varying a time delay between frames of data within said run-time data samples;
(iv) varying the complexity of data within said run-time data samples; and
(v) varying the form of data within said run-time data samples;
(b) sensing an aggregate data transfer rate for each run-time data sample transferred;
(c) selecting an optimum aggregate data transfer rate; and
(d) optimizing data transfer between said transmitting device and said at least one peripheral based on a run-time data sample corresponding to said optimum aggregate data transfer rate.

12. The method of claim 11 further comprising the step of performing said adaptive run-time data transfer optimization between a page-language-description-printer and a CPU.

13. The method of claim 11 further comprising the step of optimizing at least one data window size advertised by said at least one peripheral over a network.

14. A method for adaptive run-time data transfer optimization between a transmitting device and at least one peripheral, said method comprising the steps of:
(a) transferring run-time data samples between said transmitting device and said at least one peripheral;
(b) sensing an aggregate data transfer rate for each run-time data sample transferred;
(c) selecting an optimum aggregate data transfer rate;
(d) optimizing data transfer between said transmitting device and said at least one peripheral based on a run-time data sample corresponding to said optimum aggregate data transfer rate; and
(e) optimizing a data transfer rate to a printer by selecting an optimum time delay between frames of data transferred to said printer.

15. The method of claim 14 further comprising the step of performing said adaptive run-time data transfer optimization between a page-language-description-printer and a CPU.

16. The method of claim 14 further comprising the step of optimizing at least one data window size advertised by said at least one peripheral over a network.

17. A method for adaptive run-time data transfer optimization between a transmitting device and at least one peripheral, said method comprising the steps of:
(a) transferring run-time data samples between said transmitting device and said at least one peripheral;
(b) sensing an aggregate data transfer rate for each run-time data sample transferred;
(c) selecting an optimum aggregate data transfer rate;
(d) optimizing data transfer between said transmitting device and said at least one peripheral based on a run-time data sample corresponding to said optimum aggregate data transfer rate; and
(e) optimizing a data transfer rate to said at least one peripheral through a computer hardware port by selecting an optimum size for the allocated buffer of said port.

18. The method of claim 17 further comprising the step of performing said adaptive run-time data transfer optimization between a page-language-description-printer and a CPU.

19. The method of claim 17 further comprising the step of optimizing at least one data window size advertised by said at least one peripheral over a network.

20. A run-time optimizer for data transfers between a CPU and a peripheral, comprising:
(a) a calibrator having a data transferor for sending data samples to said peripheral and a data transfer rate profiler;
(b) said data transfer rate profiler having a tabulator for relating aggregate data transfer rates to data samples transferred to said peripheral;
(c) an optimizer for selecting a data sample corresponding to a maximum aggregate data transfer rate; and
(d) a reader for sensing said aggregate data transfer rates.

21. The run-time optimizer of claim 20, wherein said peripheral is a printer.

22. A run-time optimizer for data transfers between a CPU and a peripheral, comprising:
(a) a calibrator having a data transferor for sending data samples to said peripheral and a data transfer rate profiler;
(b) said data transfer rate profiler having a tabulator for relating aggregate data transfer rates to data samples transferred to said peripheral;
(c) an optimizer for selecting a data sample corresponding to a maximum aggregate data transfer rate; and
(d) a measurer for determining said aggregate data transfer rates.

23. A run-time optimizer for data transfers between a CPU and a peripheral, comprising:
(a) a calibrator having a data transferor for sending data samples to said peripheral and a data transfer rate profiler;
(b) said data transfer rate profiler having a tabulator for relating aggregate data transfer rates to data samples transferred to said peripheral;
(c) an optimizer for selecting a data sample corresponding to a maximum aggregate data transfer rate; and
(d) a hardware control portion for transmitting data to said peripheral using said data sample corresponding to a maximum aggregate data transfer rate as a model for data transmission and hardware configuration.

* * * * *